US010616425B2

(12) United States Patent
Ishihara

(10) Patent No.: US 10,616,425 B2
(45) Date of Patent: Apr. 7, 2020

(54) IMAGE FORMING APPARATUS AND IMAGE FORMING METHOD

(71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Atsushi Ishihara, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/935,127

(22) Filed: Mar. 26, 2018

(65) Prior Publication Data

US 2019/0297203 A1 Sep. 26, 2019

(51) Int. Cl.
*H04N 1/00* (2006.01)
*G06K 9/00* (2006.01)

(52) U.S. Cl.
CPC ..... *H04N 1/00392* (2013.01); *G06K 9/00496* (2013.01)

(58) Field of Classification Search
CPC .......... H04N 1/00392; G06K 9/00496; G06K 9/2018; G06K 9/00369

USPC ....................................................... 358/1.14
See application file for complete search history.

(56) References Cited

U.S. PATENT DOCUMENTS

| 9,319,149 B2* | 4/2016 | Luna ................... H04M 1/7253 |
| 2015/0237227 A1* | 8/2015 | Saisho ............... H04N 1/00875 348/77 |
| 2019/0101377 A1* | 4/2019 | White .................... G01B 11/14 |

FOREIGN PATENT DOCUMENTS

| JP | 2013-3994 | 1/2013 |
| JP | 2013-125382 | 6/2013 |
| JP | 2015-139963 | 8/2015 |

* cited by examiner

*Primary Examiner* — Tammy Paige Goddard
*Assistant Examiner* — Darryl V Dottin
(74) *Attorney, Agent, or Firm* — Amin, Turocy & Watson, LLP

(57) ABSTRACT

An image forming apparatus of an embodiment includes a sensor unit, an operation identification unit, and an object detection unit. The sensor unit receives an electromagnetic wave and outputs information indicating a physical quantity of the received electromagnetic wave. The operation identification unit identifies an input operation to its own apparatus, based on the information indicating the physical quantity of the electromagnetic wave. The object detection unit detects the presence or absence of an object around its own apparatus, based on the information indicating the physical quantity of the electromagnetic wave.

9 Claims, 12 Drawing Sheets

IMAGE FORMING APPARATUS AND IMAGE FORMING METHOD

FIELD

Embodiments described herein relate generally to an image forming apparatus and an image forming method.

BACKGROUND

In the related art, there is an image forming apparatus including a human sensing function for detecting a user and an operation identification function for identifying a user's operation performed on an operation panel. In such an image forming apparatus, it is necessary to separately provide a sensor for realizing the human sensing function and a sensor for realizing the operation identification function.

DETAILED DESCRIPTION

According to an exemplary embodiment, an image forming apparatus includes a sensor unit, an operation identification unit, and an object detection unit. A sensor unit receives an electromagnetic wave and outputs information indicating a physical quantity of the received electromagnetic wave. An operation identification unit identifies an input operation to its own apparatus based on the information indicating the physical quantity of the electromagnetic wave. The object detection unit detects the presence or absence of an object around its own apparatus based on the information indicating the physical quantity of the electromagnetic wave.

Figure 1:
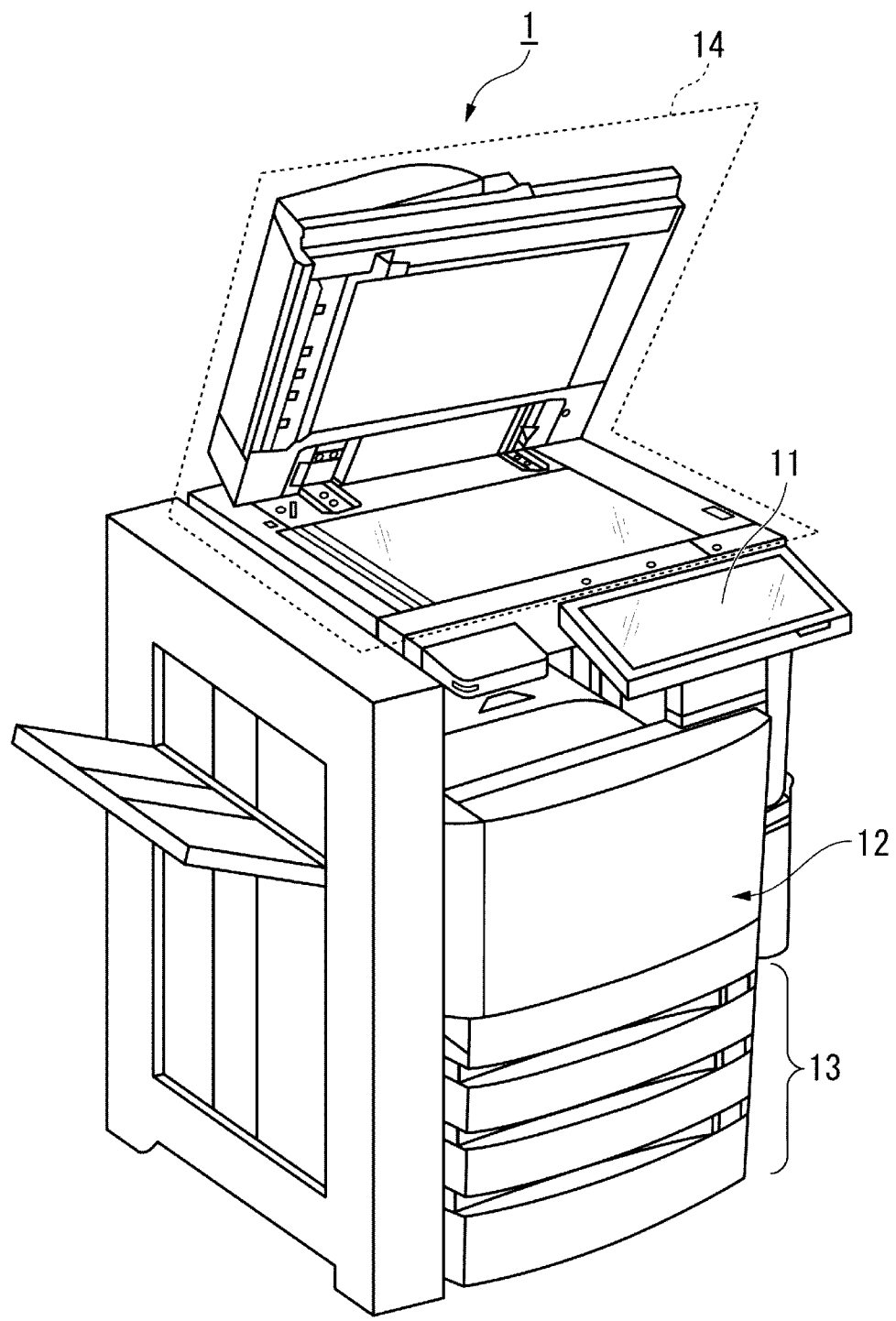
FIG. 1 is an outside view illustrating a specific example of the overall configuration of an image forming apparatus of an embodiment.

FIG. 1 is an outside view illustrating a specific example of the overall configuration of an image forming apparatus 1 of an embodiment. The image forming apparatus 1 has two operation modes of an operation identification mode and a human sensor mode. The operation identification mode is an operation mode for realizing an operation identification function. The human sensor mode is an operation mode for realizing a human detection function.

The image forming apparatus 1 is, for example, a multi-function apparatus. The image forming apparatus 1 includes an input and output unit 11, an image forming unit 12, a sheet storage unit 13, and an image reading unit 14. The image forming unit 12 of the image forming apparatus 1 may be an apparatus for fixing a toner image or an ink jet type apparatus.

The image forming apparatus 1 forms an image on a sheet using a developer such as a toner. The sheet is, for example, paper or label paper. The sheet may be anything as long as the image forming apparatus 1 can form an image on the surface thereof.

The input and output unit 11 is an operation panel, and receives a user's input to the image forming apparatus 1 (hereinafter, referred to as "user input") by receiving the infrared ray. The input and output unit 11 displays information on its own apparatus. The input and output unit 11 may be any device as long as it can accept user input using the infrared ray, for example, may be an infrared type touch panel.

The image forming unit 12 forms an image on the sheet based on image information generated by the image reading unit 14 or image information received via a communication path. The image forming unit 12 forms an image by the following processing, for example. An image forming portion of the image forming unit 12 forms an electrostatic latent image on a photosensitive drum based on image information. The image forming portion of the image forming unit 12 forms a visible image by attaching a developer to the electrostatic latent image. A specific example of the developer is a toner. A transfer unit of the image forming unit 12 transfers the visible image onto the sheet. A fixing unit of the image forming unit 12 fixes the visible image on the sheet by heating and pressurizing the sheet. The sheet on which the image is formed may be a sheet stored in the sheet storage unit 13 or may be a sheet pointed by hand.

The sheet storage unit 13 stores sheets to be used for image formation in the image forming unit 12.

The image reading unit 14 reads image information to be read as light and shade of light. The image reading unit 14 records the read image information. The recorded image information may be transmitted to another information processing apparatus via a network. The recorded image information may be formed on the sheet by the image forming unit 12.

Figure 2:
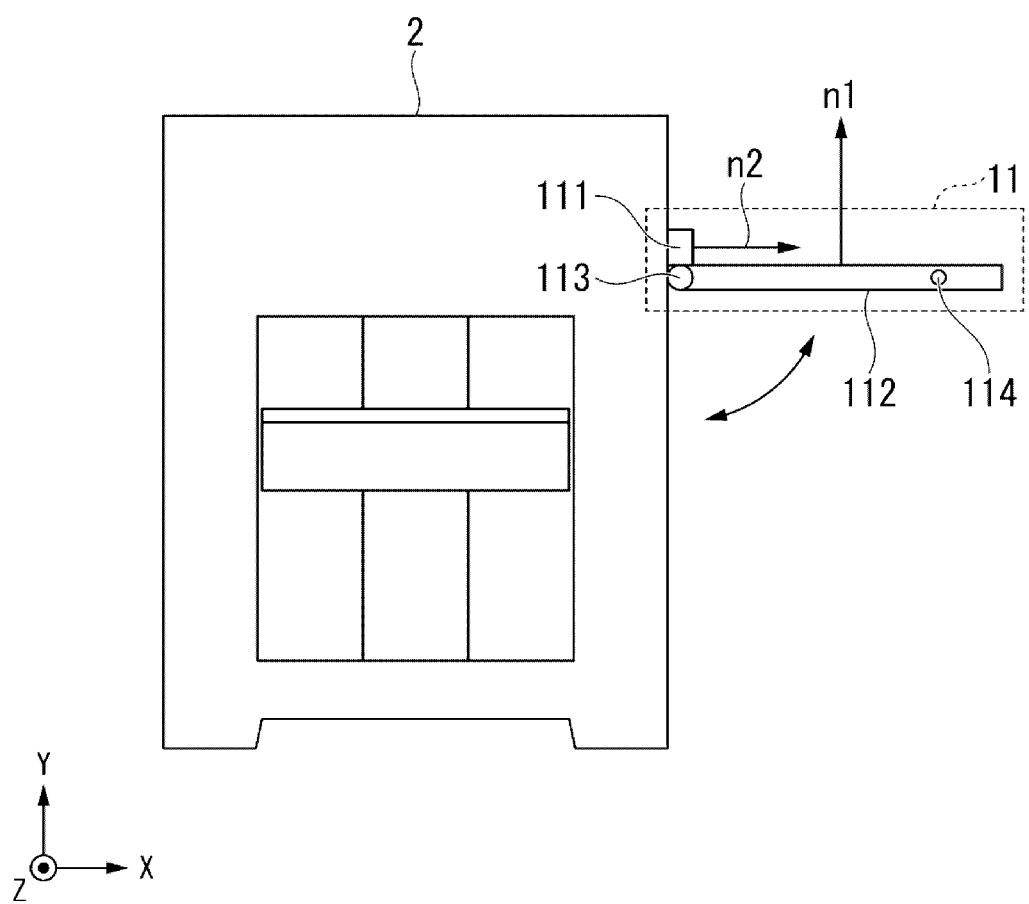
FIG. 2 is a cross-sectional view illustrating a specific example of a configuration of the image forming apparatus.

FIG. 2 is a cross-sectional view illustrating a specific example of the configuration of the image forming apparatus 1 of the embodiment.

The image forming apparatus 1 includes a main body 2 and the input and output unit 11. The main body 2 includes the image forming unit 12, the sheet storage unit 13, and the image reading unit 14.

The input and output unit 11 includes a light sensor 111, a display unit 112, a movable unit 113, and a position sensor 114.

The light sensor 111 receives an infrared ray radiated by the user's body. When intensity of received light is equal to or higher than predetermined intensity, the light sensor 111 outputs information (hereinafter, referred to as "light reception information") corresponding to a physical quantity relating to received infrared ray. The intensity of received light is intensity of the infrared ray received by the light sensor 111. The predetermined intensity is intensity upon which the light sensor 111 outputs the light reception information in a case where the intensity of received light is equal to or higher than the predetermined intensity, and is intensity according to an operation mode. Hereinafter, the predetermined intensity is referred to as threshold intensity.

The light sensor 111 does not necessarily have to receive only the infrared ray radiated by the user's body. For example, in a case where the image forming apparatus 1 according to the embodiment includes a radiation unit (not shown) that radiates the infrared ray, the light sensor 111 may receive light which is obtained by allowing the infrared ray radiated from the radiation unit to be reflected from the user's body.

The physical quantity relating to the infrared ray may be, for example, intensity of the infrared ray. For example, the physical quantity relating to the received infrared ray may be angular momentum of the infrared ray. For example, the physical quantity relating to the received infrared ray may be a polarization angle of the infrared ray. For example, light reception information may be information indicating intensity of the infrared ray received by the light sensor 111. For example, light reception information may be information indicating an angle of the polarization angle of infrared ray received by the light sensor 111. For example, light reception information may be information indicating magnitude of the angular momentum of the infrared ray received by the light sensor 111.

The angular momentum or polarization angle of the infrared ray is a physical quantity hard to be affected by disturbance than intensity of infrared ray. For that reason, in a case where the received light signal is a signal indicating these physical quantities, it is possible to suppress malfunction of the image forming apparatus 1 including the input and output unit 11 that accepts user input to the image forming apparatus 1 by receiving the infrared ray.

The display unit 112 performs display to support user input to the image forming apparatus 1. The display unit 112 performs display and receives user input to the image forming apparatus 1 in conjunction with the light sensor 111. The display unit 112 and the light sensor 111 function as an infrared type touch panel and accept inputs from the user to the image forming apparatus 1.

For the sake of simplicity, a case where the vertical direction is the Y-axis and the direction of the Y-axis is opposite to the direction of gravity is assumed.

The display unit 112 has a flat plate shape. The display unit 112 is attached to the movable unit 113 so that a normal vector n1 of the display surface can be rotated about the movable unit 113 from the vertical direction to the horizontal direction. The normal vector n1 of the display surface is a unit vector perpendicular to the display surface. The display surface is a surface on which display for supporting user input to the image forming apparatus 1 is performed, and is a surface parallel to the XZ plane in FIG. 2. The normal vector n1 of the display surface faces the vertical direction in a state where the display surface is parallel to the horizontal direction and faces the horizontal direction in a state where the display surface is parallel to the vertical direction. The normal vector n1 of the flat plate in FIG. 2 is a unit vector parallel to the Y-axis. Hereinafter, an angle between the normal vector n1 of the display surface and the normal vector n2 of the light receiving surface of the light sensor 111 is referred to as a display unit rotation angle. The light receiving surface of the light sensor 111 is a surface on which the infrared ray is received by the light sensor 111. In FIG. 2, the light receiving surface is a surface perpendicular to the X-axis, and is a surface positioned in the X-axis positive direction of the light sensor 111. The normal direction of the light receiving surface of the light sensor 111 is the direction parallel to the X-axis in FIG. 2.

The movable unit 113 holds an end portion of the display unit 112 and makes an angle of the display unit rotation angle variable.

The position sensor 114 measures a position of the display unit 112 and outputs information (hereinafter, referred to as "position information") indicating the position of the display unit 112). The position of the display unit 112 may be any position and may be, for example, a position of the center of gravity of the display unit 112. Information indicated by the position information may be any information as long as it indicates the position of the display unit 112, and may be, for example, information indicating an angle of the display unit rotation angle. The position sensor 114 may be any sensor as long as it can measure the position of the display unit 112. For example, the position sensor 114 may be an acceleration sensor.

Hereinafter, for the sake of simplicity, description will be made on the assumption that position information is information indicating the angle of the display unit rotation angle.

Figure 3:
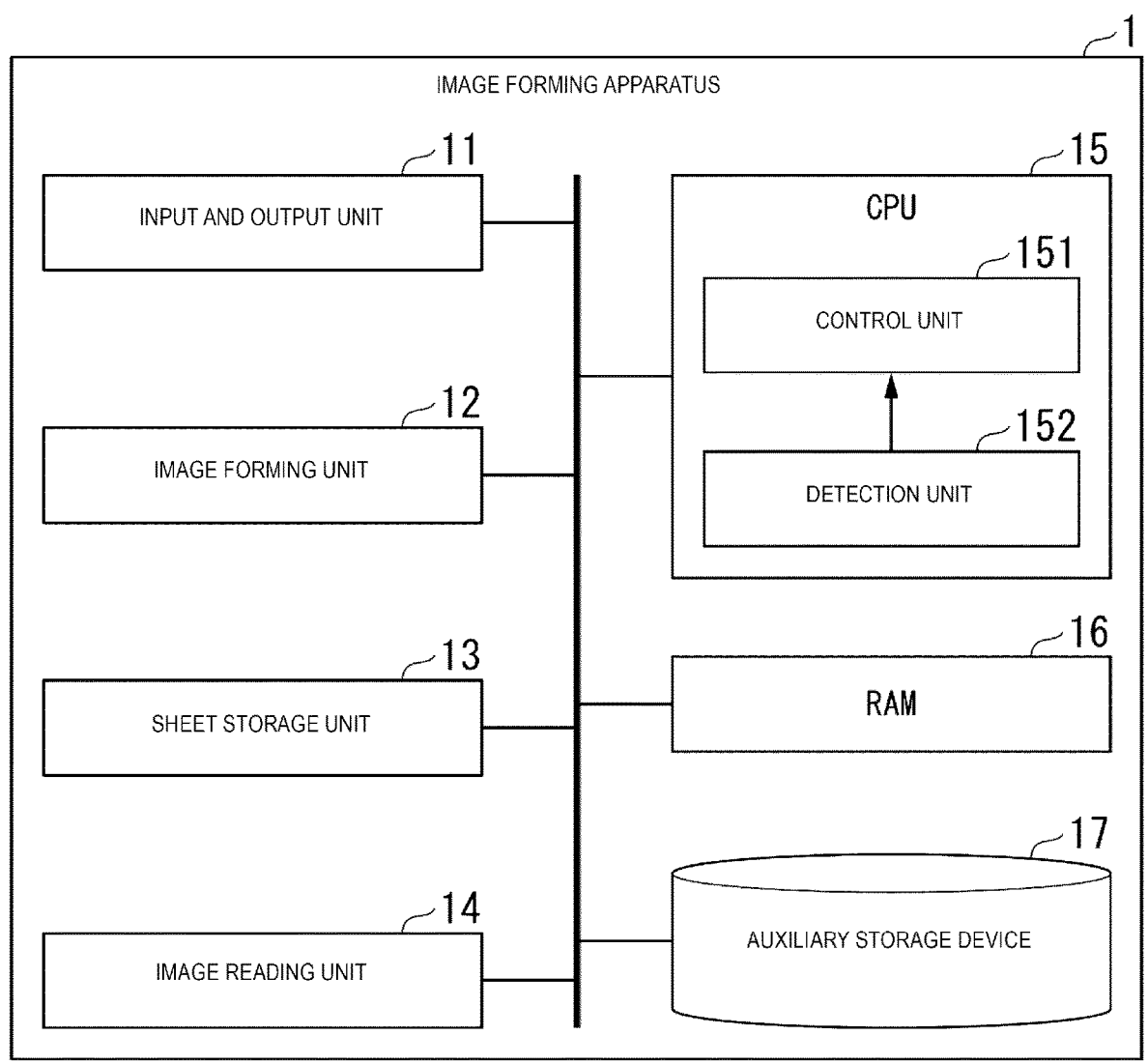
FIG. 3 is a diagram illustrating a specific example of a hardware configuration of the image forming apparatus.

FIG. 3 is a diagram illustrating a specific example of a hardware configuration of the image forming apparatus 1 according to the embodiment. The image forming apparatus 1 includes a central processing unit (CPU) 15, a random access memory (RAM) 16, an auxiliary storage device 17, an input and output unit 11, an image forming unit 12, a sheet storage unit 13, and an image reading unit 14 that are connected via a bus.

The CPU 15 includes a control unit 151 and a detection unit 152. The control unit 151 controls each functional unit of the image forming apparatus 1. The detection unit 152 outputs predetermined information to the control unit 151 based on position information output from the position sensor 114 and light reception information output from the light sensor 111. The predetermined information is information output from the detection unit 152 to the control unit 151 so as to cause that the image forming apparatus 1 to execute predetermined processing according to the position information and the light reception information. Predetermined processing may be, for example, processing in which the image forming apparatus 1 forms an image, or processing in which the image forming apparatus 1 supplies power to the image forming unit 12.

Figure 4:
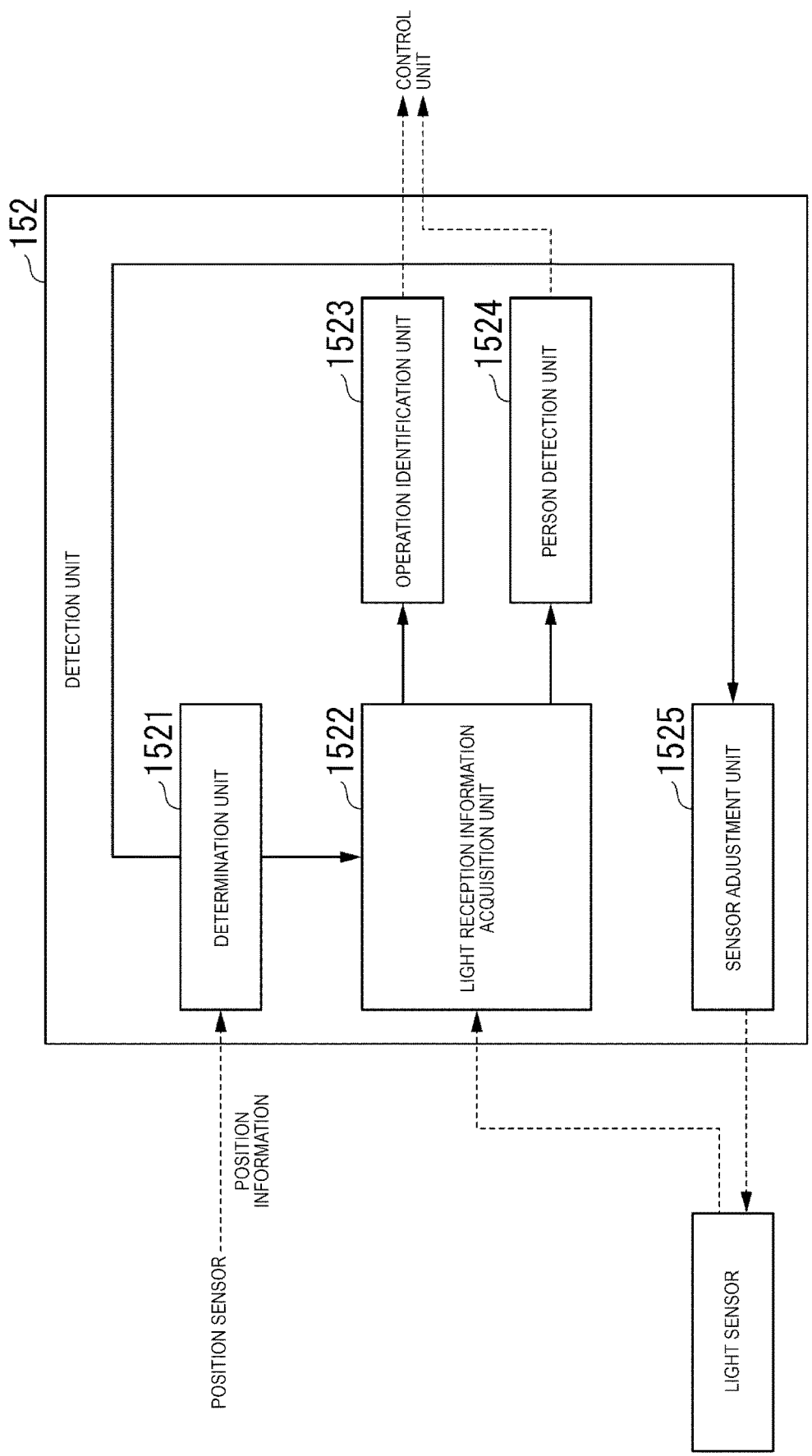
FIG. 4 is a diagram illustrating a specific example of a functional configuration of a detection unit in the image forming apparatus.

FIG. 4 is a diagram illustrating a specific example of the functional configuration of the detection unit 152 in the image forming apparatus 1 of the embodiment. The detection unit 152 includes a determination unit 1521, a light reception information acquisition unit 1522, an operation identification unit 1523, a person detection unit 1524, and a sensor adjustment unit 1525.

The determination unit 1521 determines the operation mode of image forming apparatus 1 based on the position information output by the position sensor 114. To determine the operation mode is to determine to which of the operation identification unit 1523 and the person detection unit 1524 light reception information is output. In a case where the position information indicates that the angle of the display unit rotation angle is an angle within a first range which includes 90 degrees and is set in advance, the determination unit 1521 determines the operation mode of the image forming apparatus 1 as the operation identification mode. On the other hand, in a case where the position information indicates that the angle of the display unit rotation angle is within a second range which includes 0 degree and is set in advance, the determination unit 1521 determines the operation mode of the image forming apparatus 1 to the human sensor mode. The angle within the first range and the angle within the second range are different angles and the angle within the second range is smaller than the angle within the first range. The angle of the display unit rotation angle is an angle within any one of an angle within the first range and an angle within the second range. The determination unit 1521 outputs information (hereinafter, referred to as "operation mode information") indicating the determined operation mode to the light reception information acquisition unit 1522.

The light reception information acquisition unit 1522 outputs light reception information output from the light sensor 111 to the operation identification unit 1523 or the person detection unit 1524 according to the operation mode indicated by operation mode information.

The operation identification unit 1523 acquires light reception information from the light reception information acquisition unit and identifies the content of the user input indicated by the light reception information. The operation identification unit 1523 outputs information indicating the identified content to the control unit 151.

The person detection unit 1524 acquires light reception information from the light reception information acquisition unit and determines, based on the light reception information, whether there is a person around the image forming apparatus 1 or not. The person detection unit 1524 detects the presence or absence of a person by the determination. The method for determining a person may be any method as long as it can determine a person based on light reception information. The person detection unit 1524 outputs information indicating the determined result to the control unit 151.

The sensor adjustment unit 1525 adjusts light reception sensitivity of the light sensor 111 based on operation mode information output by the determination unit 1521. For example, in a case where the operation mode information indicates that the operation mode is the operation identification mode, the sensor adjustment unit 1525 adjusts light reception sensitivity of the light sensor 111 to first sensitivity. On the other hand, in a case where the operation mode information indicates that the operation mode is the human sensor mode, the sensor adjustment unit 1525 adjusts light reception sensitivity of the light sensor 111 to second sensitivity higher than the first sensitivity. The light reception sensitivity is a value indicating height of threshold intensity, and is a value which means that the higher the value, the lower the threshold intensity.

The first sensitivity may be any sensitivity as long as the image forming apparatus 1 in the operation identification mode operates to realize the operation identification function. For example, the first sensitivity may be sensitivity obtained in a case where light receivable space is space near the display surface of the display unit 112. The light receivable space is space in which intensity of received light of the light sensor 111 with respect to the infrared ray radiated from the user's body existing in the space is equal to or higher than the threshold intensity. Accordingly, light receivable space becomes narrower as the light reception sensitivity of the light sensor 111 decreases due to adjustment of the sensor adjustment unit 1525. For that reason, the input and output unit 11 can accept the user input with high accuracy.

The second sensitivity may be any sensitivity as long as the image forming apparatus 1 in the human sensor mode operates to realize the human sensing function. For example, the second sensitivity may be sensitivity obtained in a case where light receivable space is space around the image forming apparatus 1 and wider than the light receivable space for the first sensitivity.

Hereinafter, with reference to FIGS. 5 to 8, a relationship between the operation mode of the image forming apparatus 1 and light receivable space will be described.

Figure 5:
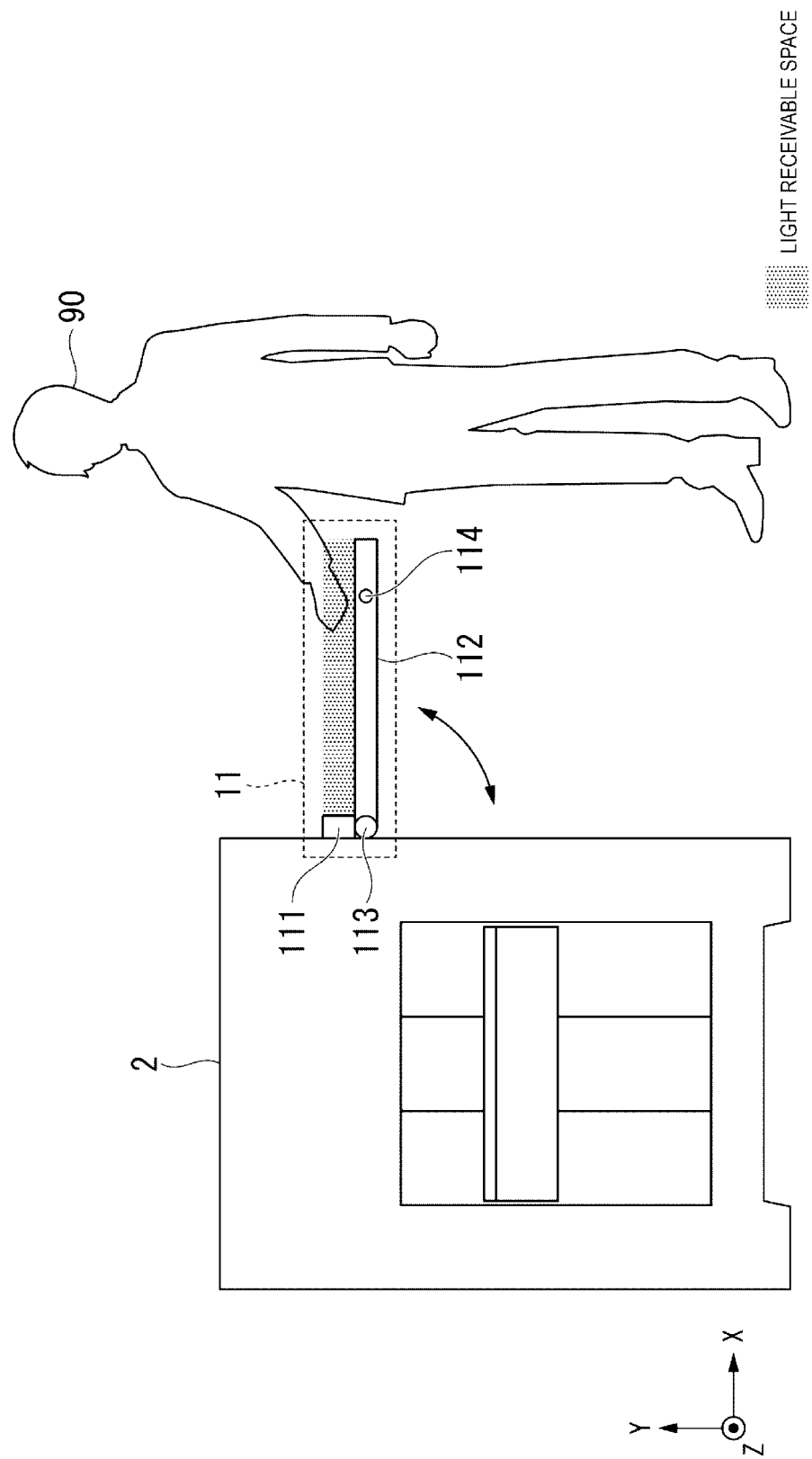
FIG. 5 is a cross-sectional view of the image forming apparatus illustrating a specific example of light receivable space of a light sensor in an operation identification mode of the image forming apparatus.

FIG. 5 is a cross-sectional view of the image forming apparatus 1 illustrating a specific example of light receivable space of the light sensor 111 in the operation identification mode of the image forming apparatus 1 of the embodiment.

In a case where the display unit rotation angle is 90 degrees, the operation mode of the image forming apparatus 1 is the operation identification mode. In the operation identification mode, light reception sensitivity of the light sensor 111 is the first sensitivity and light receivable space is in the vicinity of the display surface of the display unit 112.

In the operation identification mode, the light sensor 111 receives the infrared ray radiated from the body of a user 90 existing in the vicinity of the surface of the display unit 112 and outputs light reception information. For that reason, in the operation identification mode, a possibility that the input and output unit 11 is operated due to noise is reduced, and the operation of the input and output unit 11 is stabilized.

Figure 6:
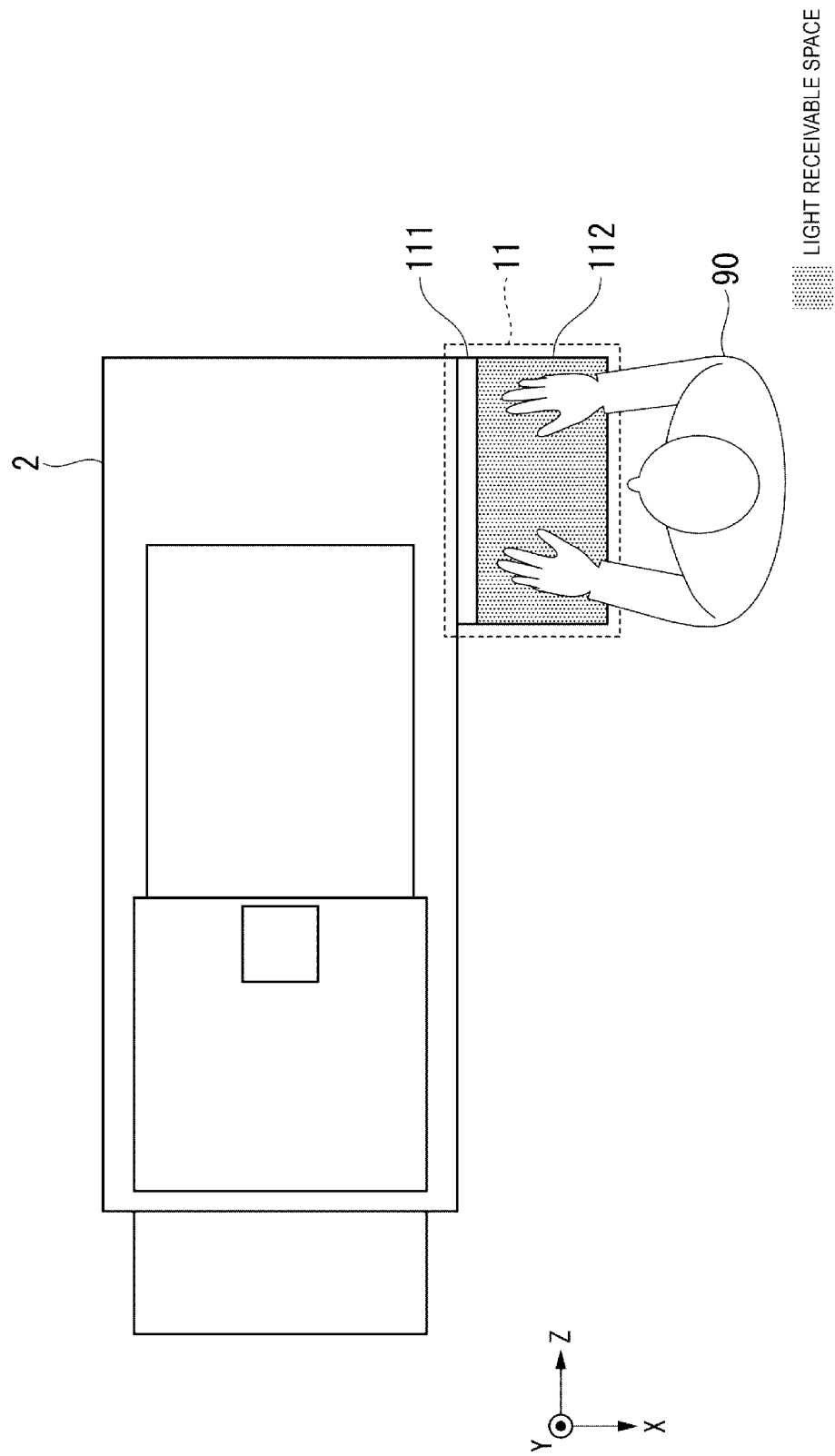
FIG. 6 is a top view of the image forming apparatus for explaining light reception sensitivity of the light sensor in the operation identification mode of the image forming apparatus.

FIG. 6 is a top view of the image forming apparatus 1 for explaining light reception sensitivity of the light sensor 111 in the operation identification mode of the image forming apparatus 1 of the embodiment.

In a case where the display unit rotation angle is 90 degrees, an area of the display unit 112 in the XZ plane and an area of light receivable space in the XZ plane are approximately the same.

Figure 7:
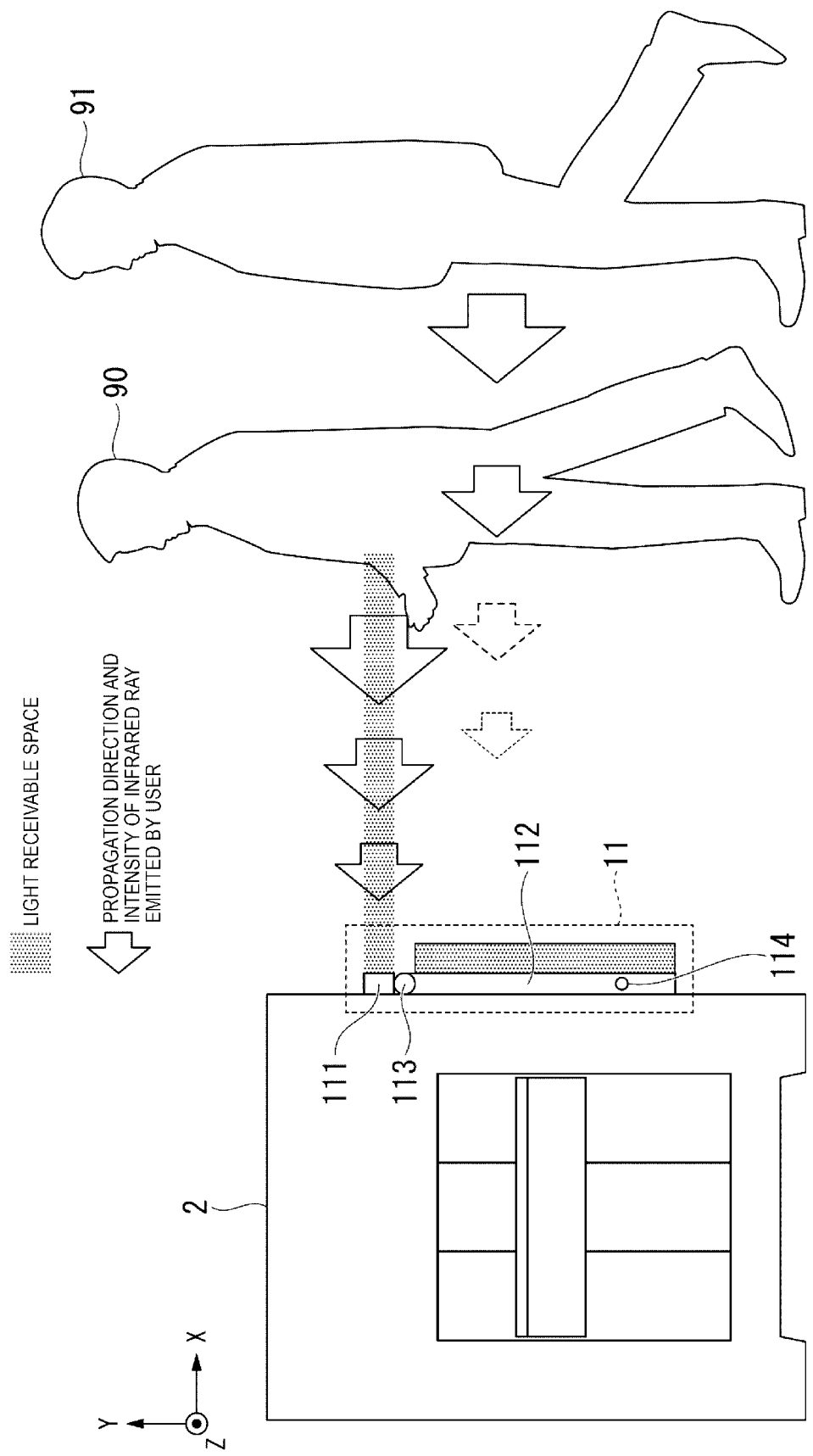
FIG. 7 is a cross-sectional view of the image forming apparatus illustrating a specific example of light receivable space of the light sensor in the human sensor mode of the image forming apparatus.

FIG. 7 is a cross-sectional view of the image forming apparatus 1 illustrating a specific example of the light receivable space of the light sensor 111 in the human sensor mode of the image forming apparatus 1 of the embodiment.

In a case where the display unit rotation angle is 0 degree, the operation mode of the image forming apparatus 1 is the human sensor mode. In the human sensor mode, the light reception sensitivity of the light sensor 111 is the second sensitivity that is higher than the first sensitivity. For that reason, in the human sensor mode, the light receivable space is space wider than the light receivable space in the operation identification mode and is the space around the image forming apparatus 1. In FIG. 7, a user 91 is at a position apart from the user 90 around the image forming apparatus 1 and at a position that is not light receivable space. That is, the user 91 is not around the image forming apparatus 1. For that reason, intensity of received light at the light sensor 111 of the infrared ray radiated by the user 91 is weaker than the threshold intensity. On the other hand, since the user 90 is in the light receivable space, intensity of received light of the infrared ray radiated by the user 90 at the light sensor 111 is stronger than the threshold intensity. For that reason, in the human sensor mode, the image forming apparatus 1 detects only the user 90 who is around the vicinity of the image forming apparatus 1 and does not detect the user 91 who is not around the image forming apparatus 1.

Figure 8:
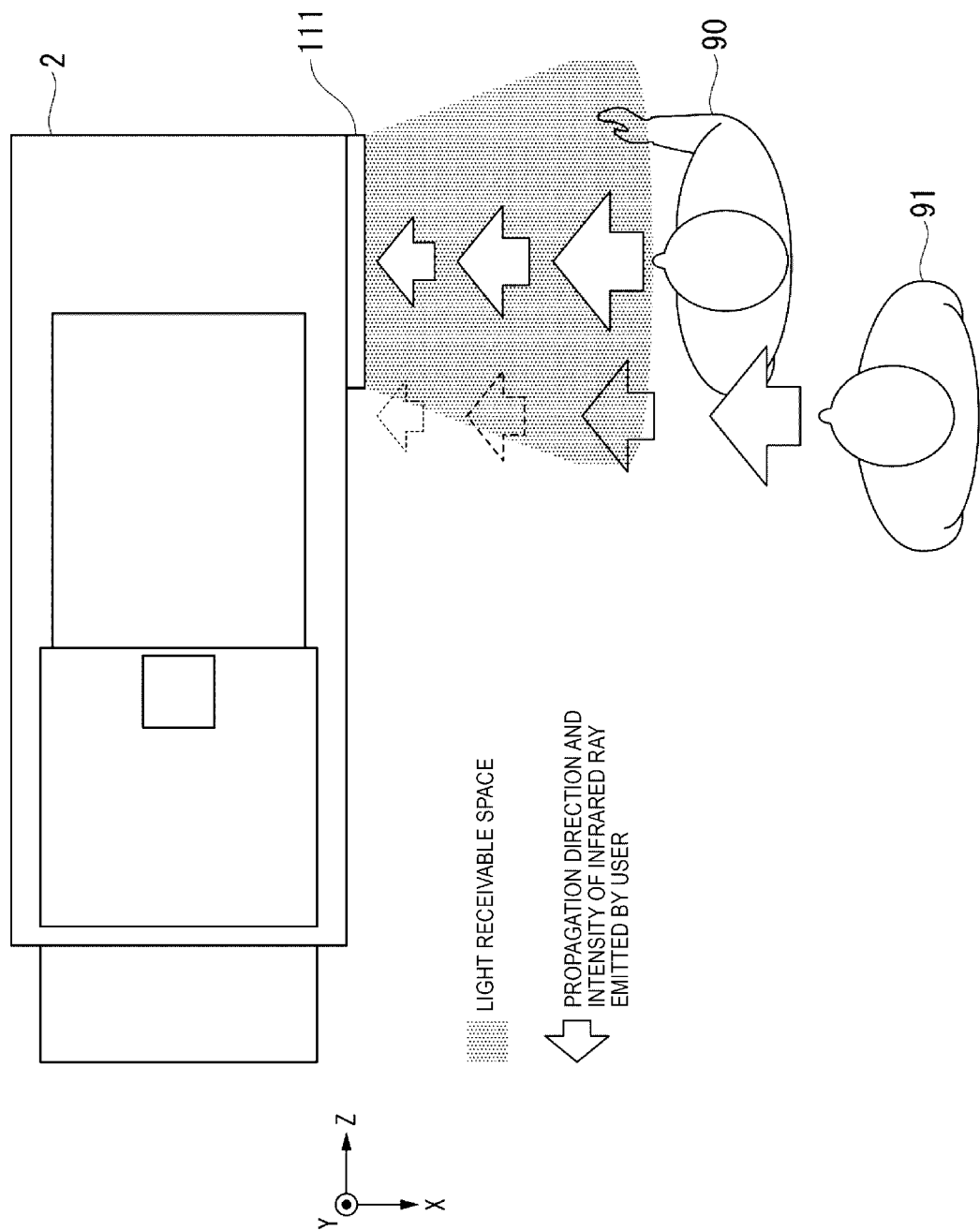
FIG. 8 is a top view of the image forming apparatus illustrating a specific example of light receivable space of the light sensor in the human sensor mode of the image forming apparatus.

FIG. 8 is a top view of the image forming apparatus 1 illustrating a specific example of light receivable space of the light sensor 111 in the human sensor mode of the image forming apparatus 1 of the embodiment.

In a case where the display unit rotation angle is 0 degree, an area of the light receivable space in the XZ plane larger than an area of the display unit 112 in the XZ plane of FIG. 6.

Figure 9:
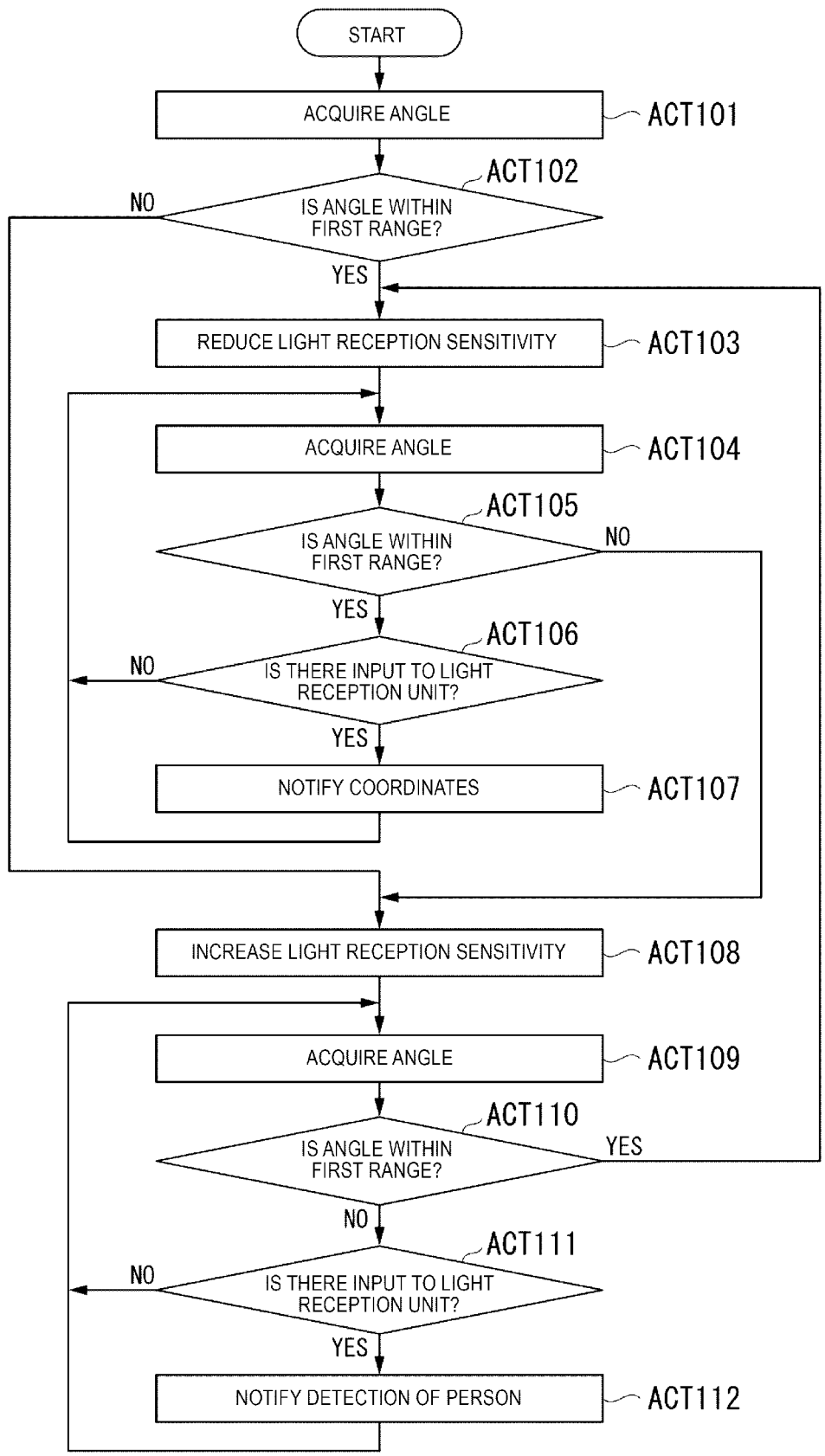
FIG. 9 is a flowchart illustrating a specific processing flow in which the image forming apparatus performs either one of accepting a user input and detecting a user.

FIG. 9 is a flowchart illustrating a specific processing flow in which the image forming apparatus 1 according to the embodiment performs one of accepting a user input and detecting a user.

The position sensor 114 acquires an angle of the display unit rotation angle (ACT 101). The position sensor 114 outputs position information indicating the angle of the display unit rotation angle. The determination unit 1521 acquires the position information and determines whether the angle of the display unit rotation angle is an angle within the first range or not (ACT 102). When it is determined that the angle of the display unit rotation angle is the angle within the first range (Yes in ACT 102), the determination unit 1521 outputs operation mode information indicating that the operation mode is the operation identification mode to the sensor adjustment unit 1525 and the light reception information acquisition unit 1522. The sensor adjustment unit 1525 having acquired the operation mode information sets the light reception sensitivity of the light sensor 111 to the first sensitivity (ACT 103). After ACT 103, the position sensor 114 acquires an angle of the display unit rotation angle (ACT 104). The position sensor 114 outputs position information indicating the angle of the display unit rotation angle. The determination unit 1521 acquires the position information and determines whether the angle of the display unit rotation angle is an angle within the first range or not (ACT 105). When it is determined that the angle of the display unit rotation angle is the angle within the first range (Yes in ACT 105), the light reception information acquisition unit 1522 waits (No in ACT 106) until there is an input to the input and output unit 11.

When it is determined that there is an input to the input and output unit 11 (Yes in ACT 106), the light reception information acquisition unit 1522 outputs light reception information to the operation identification unit 1523. The operation identification unit 1523 having acquired the light reception information identifies the content of the user input indicated by the light reception information and outputs a signal indicating the identification result to the control unit 151 (ACT 107).

On the other hand, when it is determined that the angle of the display unit rotation angle is not the angle within the first range (No in ACT 105), the sensor adjustment unit 1525 sets the light reception sensitivity of the light sensor 111 to the second sensitivity (ACT 108).

On the other hand, in ACT 102, when it is determined that the angle of the display unit rotation angle is not the angle within the first range (No in ACT 102), the determination unit 1521 outputs the operation mode information indicating that the operation mode is the human sensor mode to the sensor adjustment unit 1525 and the light reception information acquisition unit 1522. The sensor adjustment unit 1525 having acquired the operation mode information sets the light reception sensitivity of the light sensor 111 to the second sensitivity (ACT 108). After ACT 108, the position sensor 114 acquires the angle of the display unit rotation angle (ACT 109). The position sensor 114 outputs position information indicating the angle of the display unit rotation angle. The determination unit 1521 acquires the position information and determines whether the angle of the display unit rotation angle is within the first range or not (ACT 110).

When it is determined that the angle of the display unit rotation angle is not the angle within the first range (No in ACT 110), the light reception information acquisition unit 1522 waits (No in ACT 111) until the infrared ray having the intensity exceeding the threshold intensity is input to the light sensor 111. When it is determined that the infrared ray having intensity exceeding the threshold intensity is input to the light sensor 111 (Yes in ACT 111), the light reception information acquisition unit 1522 outputs the light reception information to the person detection unit 1524. The person detection unit 1524 having acquired the light reception information determines the presence or absence of a person based on the light reception information and outputs a signal indicating the determination result to the control unit 151 (ACT 112).

On the other hand, when it is determined that the angle of the display unit rotation angle is the angle within the first range (Yes in ACT 110), the sensor adjustment unit 1525 sets the light reception sensitivity of the light sensor 111 to the first sensitivity (ACT 103).

The image forming apparatus 1 of the embodiment configured as described above includes the light sensor 111 and the determination unit 1521 that determines the operation mode of the image forming apparatus 1 according to the position of the display unit 112 and thus, it is possible to realize the human sensing function and operation identification function by the same light sensor 111 regardless of the function.

Modification Example

The light sensor 111 does not necessarily have to receive the infrared ray and output light reception information. The light sensor 111 may receive electromagnetic waves other than the infrared ray and output light reception information. For example, the light sensor 111 may receive visible light and output light reception information. Also, the light sensor 111 may receive sound waves and output light reception information. Hereinafter, constituents having the same functions as those of 1 to 4 are denoted by the same reference numerals, and description thereof will be omitted.

Figure 10:
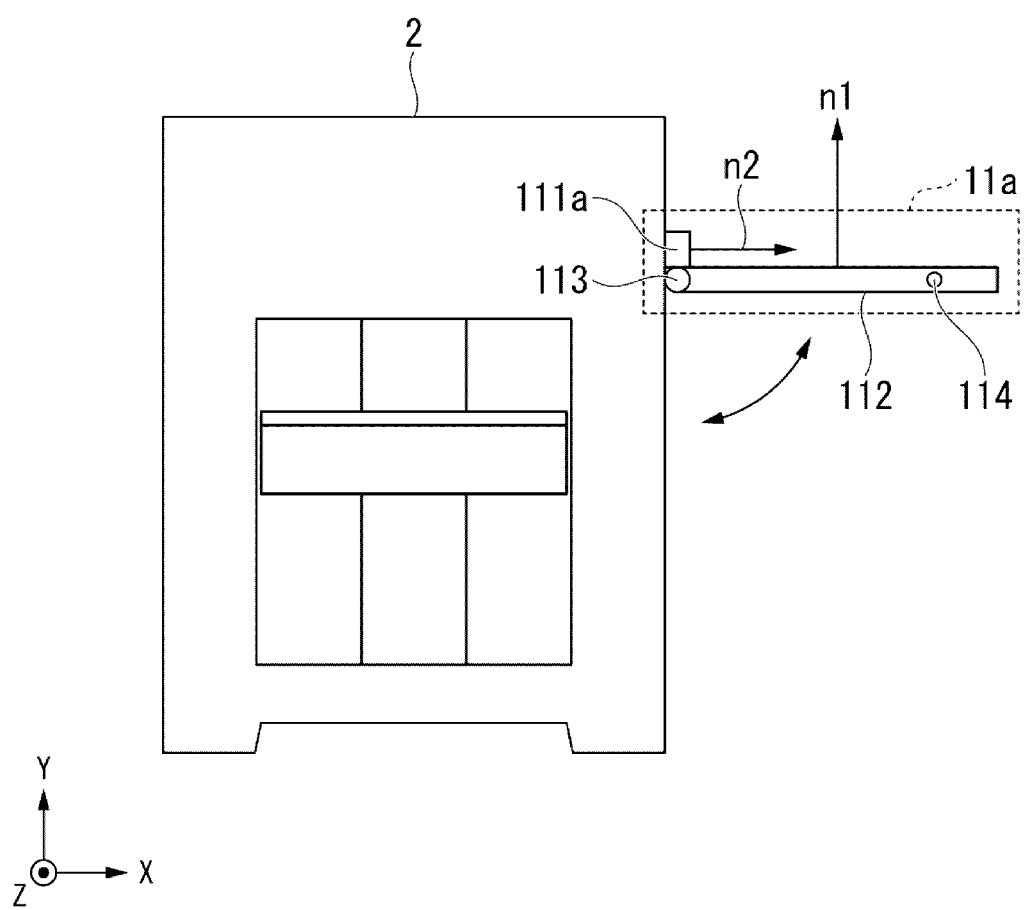
FIG. 10 is a specific top view of an image forming apparatus according to a modification example.

FIG. 10 is a specific top view of an image forming apparatus 1a according to a modification example. The image forming apparatus 1a of the modification example is different from the image forming apparatus 1 of the embodiment in that the image forming apparatus 1a includes an input and output unit 11a instead of the input and output unit 11. The input and output unit 11a is different from the input and output unit 11 in that the input and output unit 11a includes a light sensor 111a instead of the light sensor 111.

The light sensor 111a performs radiation and reception of the infrared ray. The light sensor 111a receives scattered component of the radiated infrared ray and outputs light reception information. The light sensor 111a does not necessarily need to radiate and receive the infrared ray and output light reception information. The light sensor 111a may radiate and receive electromagnetic waves other than the infrared ray and output light reception information. For example, the light sensor 111a may radiate and receive visible light and output light reception information. Also, the light sensor 111a may radiate and receive sound waves and output light reception information.

Figure 11:
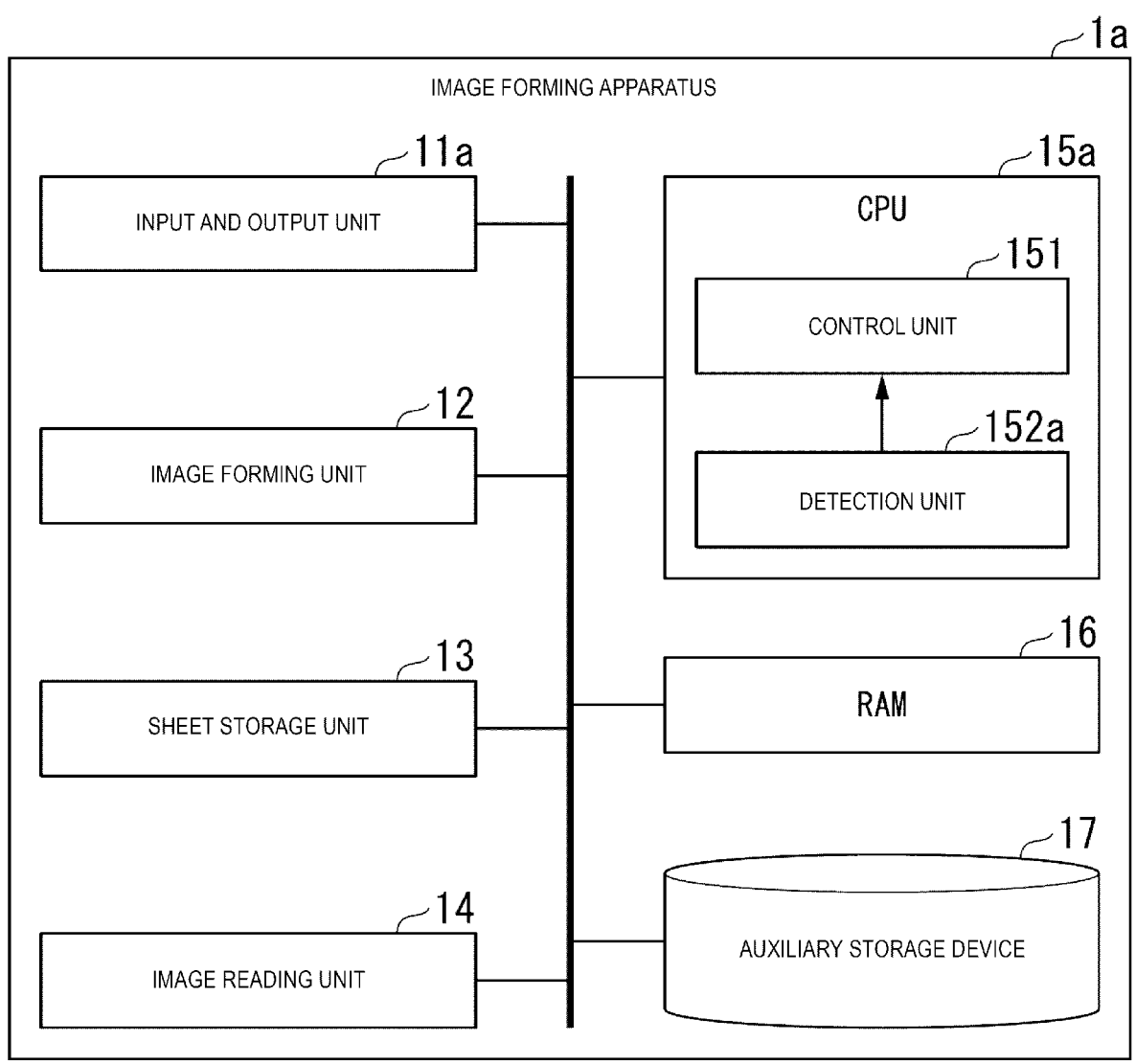
FIG. 11 is a diagram illustrating a specific example of a hardware configuration of the image forming apparatus.

FIG. 11 is a diagram illustrating a specific example of a hardware configuration of the image forming apparatus 1a of the modification example. The image forming apparatus 1a of the modification is different from the image forming apparatus 1 of the embodiment in that the image forming apparatus 1a includes an input and output unit 11a instead of the input and output unit 11 and includes a CPU 15a instead of the CPU 15. The CPU 15a is different from the CPU 15 in that the CPU 15a includes a detection unit 152a instead of the detection unit 152.

Figure 12:
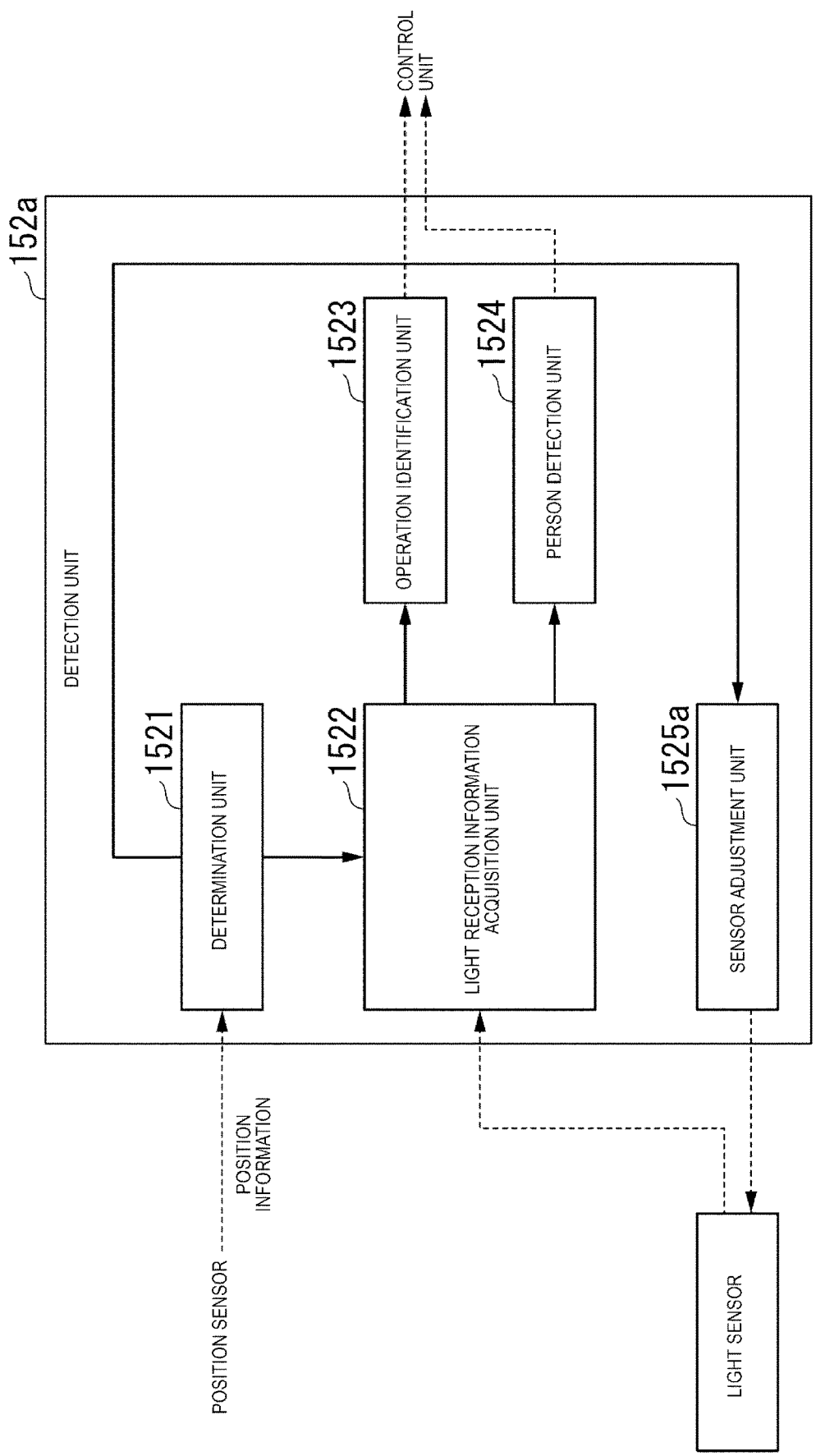
FIG. 12 is a diagram illustrating a specific example of a functional configuration of a detection unit.

FIG. 12 is a diagram illustrating a specific example of a functional configuration of the detection unit 152a of the modification example. The detection unit 152a differs from the detection unit 152 in that the detection unit 152a includes a sensor adjustment unit 1525a instead of the sensor adjustment unit 1525.

The sensor adjustment unit 1525a adjusts light reception sensitivity of the light sensor 111a to infrared ray and adjusts radiation intensity of the infrared ray radiated from the light sensor 111a.

The image forming apparatuses 1 and 1a may not only detect the user's body, but may also detect the object.

The person detection unit 1524 is an example of an object detection unit. The position sensor 114 is an example of a measurement unit. The light sensor 111 and the light sensor 111a are examples of a sensor unit.

The image forming apparatuses 1 and 1a have a CPU, a memory, an auxiliary storage device, and the like connected via a bus, and function as an image forming apparatus having an operation identification function and a human detection function by executing a program. All or some of the functions of the image forming apparatuses 1 and 1a may be realized by using hardware such as an application specific integrated circuit (ASIC), a programmable logic device (PLD), a field programmable gate array (FPGA), and the like. The program may be recorded on a computer-readable recording medium. The computer-readable recording medium is a storage device, for example, a portable medium such as a flexible disk, a magneto-optical disk, a ROM, a CD-ROM, and a hard disk or the like built in the computer system. The program may be transmitted via an electric communication line.

According to at least one embodiment described above, since the light sensor unit 111 and the determination unit 1521 that determines the operation mode of the image forming apparatus 1 according to the position of the display unit 112 are provided, it is possible to realize the operation identification function and the human sensing function by the same light sensor unit 111 regardless of the function.

While certain embodiments have been described these embodiments have been presented by way of example only, and are not intended to limit the scope of the inventions. Indeed, the novel embodiments described herein may be embodied in a variety of other forms: furthermore various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. An image forming apparatus, comprising:
a sensor that receives an electromagnetic wave and outputs information indicating a physical quantity of the received electromagnetic wave;
a display that displays information on its own apparatus;
a processor that executes instructions to perform operations, comprising:
changing an angle formed between a display surface and a light receiving surface of the sensor;
measuring the angle;
identifying an operation on the display surface based on the information indicating the physical quantity of the electromagnetic wave in a case where the angle is a first angle within a first range;
detecting a presence or an absence of an object around its own apparatus based on the information indicating the physical quantity of the electromagnetic wave, in a case where the angle measured is a second angle within a second range.

2. The apparatus according to claim 1, wherein the operations further comprise:
receiving an input to its own apparatus; and
holding an end portion of the input.

3. The apparatus according to claim 2, wherein the operations further comprise:
adjusting light reception sensitivity of the sensor,
wherein the light reception sensitivity is adjusted to a predetermined light reception sensitivity which is set in advance.

4. The apparatus according to claim 2, wherein the operations further comprise:
determining to output information indicating the physical quantity of the electromagnetic wave in a case where the angle measured is within the first range, and
determining to output information indicating the physical quantity of the electromagnetic wave in a case where the second angle measured is within the second range that is different from the first range.

5. The apparatus according to claim 4,
wherein the angle within the first range is an angle smaller than the second angle within the second range, and
wherein the operations further comprise, determining to which of the determining of the information and the detecting of the information indicating the physical quantity of the electromagnetic wave is to be output, based on the angle measured.

6. The apparatus according to claim 5, wherein the operations further comprise:
adjusting light reception sensitivity of the sensor,
wherein the light reception sensitivity of the sensor is adjusted to a first sensitivity in a case where an angle measured is within the first range, and
adjusting the light reception sensitivity of the sensor is adjusted to a second sensitivity that is higher than the first sensitivity in a case where the second angle measured is within the second range.

7. The apparatus according to claim 1, wherein the operations further comprise:
identifying an input operation to its own apparatus based on an intensity of the electromagnetic wave received by the sensor, and
detecting the presence or absence of an object around its own apparatus based on intensity of the electromagnetic wave received by the sensor.

8. The apparatus according to claim 1, wherein the operations further comprise:
identifying an input operation to its own apparatus based on an angular momentum of the electromagnetic wave received by the sensor, and
detecting the presence or absence of an object around its own apparatus based on the angular momentum of the electromagnetic wave received by the sensor.

9. The apparatus according to claim 1,
wherein the electromagnetic wave is an infrared ray,
and wherein the operations further comprise:
identifying an input operation to its own apparatus based on the infrared ray received by the sensor device, and detecting the presence or absence of an object around its own apparatus based on the infrared ray received by the sensor.

* * * * *